US011168517B2

(12) United States Patent
Timofejevs et al.

(10) Patent No.: US 11,168,517 B2
(45) Date of Patent: Nov. 9, 2021

(54) SYSTEMS AND METHODS FOR CONTROLLING ELECTROCHROMIC DEVICES USING INTEGRATED POWER SOURCE

(71) Applicant: Vitro Flat Glass LLC, Cheswick, PA (US)

(72) Inventors: Aleksandrs Timofejevs, Riga (LV); Ilya Rodin, Moscow (RU)

(73) Assignee: Vitro Flat Glass LLC, Cheswick, PA (US)

( * ) Notice: Subject to any disclaimer, the term of this patent is extended or adjusted under 35 U.S.C. 154(b) by 164 days.

(21) Appl. No.: 16/274,614

(22) Filed: Feb. 13, 2019

(65) Prior Publication Data

US 2019/0250480 A1 Aug. 15, 2019

Related U.S. Application Data

(63) Continuation of application No. 14/800,626, filed on Jul. 15, 2015, now abandoned.
(Continued)

(51) Int. Cl.
*E06B 9/24* (2006.01)
*E06B 9/64* (2006.01)
(Continued)

(52) U.S. Cl.
CPC ............. *E06B 9/24* (2013.01); *E06B 9/40* (2013.01); *E06B 9/64* (2013.01); *G02F 1/163* (2013.01); *E06B 2009/2464* (2013.01)

(58) Field of Classification Search
CPC . G02F 1/163; G02F 1/15; G02F 1/153; E06B 2009/2464; E06B 9/24; E06B 9/64; E06B 9/40; B60J 3/04
See application file for complete search history.

(56) References Cited

U.S. PATENT DOCUMENTS

| | | | | |
|---|---|---|---|---|
| 4,137,098 A | * | 1/1979 | Field | E06B 7/02 126/629 |
| 5,384,653 A | * | 1/1995 | Benson | G02F 1/153 359/265 |

(Continued)

FOREIGN PATENT DOCUMENTS

WO WO 2014032023 A1 * 2/2014 ............... E06B 9/24

Primary Examiner — Cara E Rakowski
(74) Attorney, Agent, or Firm — The Webb Law Firm

(57) ABSTRACT

An electrochromic device comprising: an active electrochromic layer having optical properties that vary based on an electrical voltage applied to the active electrochromic layer; an integrated energy source integrated within the electrochromic device for generating or storing electrical energy; and a controller operatively coupled to the energy source and the active electrochromic layer for applying the electrical energy generated or stored by the integrated energy source to the active electrochromic layer to achieve the optical properties desired by a user. The described electrochromic device is entirely self-contained and internally produces all the electrical energy necessary for its operation and specifically for the operation of the controller and for controlling the optical properties of the electrochromic layer. In other words, there no external wiring or any kind is required for supplying electric energy to the electrochromic device.

13 Claims, 3 Drawing Sheets

Related U.S. Application Data

(60) Provisional application No. 62/115,289, filed on Feb. 12, 2015, provisional application No. 62/025,004, filed on Jul. 15, 2014.

(51) Int. Cl.
*E06B 9/40* (2006.01)
*G02F 1/163* (2006.01)

(56) References Cited

U.S. PATENT DOCUMENTS

| | | |
|---|---|---|
| 2012/0212414 A1 | 8/2012 | Osterhout |
| 2012/0235900 A1 | 9/2012 | Border |
| 2013/0201546 A1* | 8/2013 | Berland .................. G02F 1/163 |
| | | 359/275 |
| 2013/0235323 A1 | 9/2013 | Sotzing |
| 2016/0147100 A1* | 5/2016 | Van Oosten .............. E06B 9/24 |
| | | 349/16 |
| 2016/0333636 A1* | 11/2016 | Bonucci .................. E06B 9/264 |

* cited by examiner

SYSTEMS AND METHODS FOR CONTROLLING ELECTROCHROMIC DEVICES USING INTEGRATED POWER SOURCE

CROSS-REFERENCE TO RELATED PATENT APPLICATION

The present regular U.S. patent application relies upon, claims the benefit of priority from, and is a non-provisional of U.S. provisional patent applications No. 62/025,004 filed on Jul. 15, 2014, and No. 62/115,289 filed on Feb. 12, 2015, the entire disclosure of both of which is incorporated by reference herein.

BACKGROUND OF THE INVENTION

Field of the Invention

The disclosed embodiments relate in general to the field of industrial application of devices with electrically controlled optical properties (e.g. electrochromic devices) and, more specifically, to electrochromic devices with integrated electrical power sources.

Description of the Related Art

Electrochromism is the physical phenomenon found in certain compositions of reversibly changing predetermined optical properties such as color or light transmittance with an application of an electrical voltage called a control voltage. Electrochromism provides the basis for operation of various electrochromic devices, such as smart glass well known to persons of ordinary skill in the art. The optical properties of these electrochromic devices can be controlled using the aforesaid control voltage, which makes them suitable for a wide variety of household and industry applications, such as electronically controlled window blinds.

However, all such applications known in the art require an external electrical energy source, such as electrical grid. This makes some applications of the electrochromic devices inelegant, difficult or even outright impossible as the building's electrical power outlet or other electrical connection may not be appropriately located or not available altogether. Thus, it would be highly desirable to have electrochromic devices with integrated electrical power sources for controlling the optical properties of the electrochromic material, which would not require any external electrical energy to be supplied thereto.

SUMMARY OF THE INVENTION

The inventive methodology is directed to methods and systems that substantially obviate one or more of the above and other problems associated with conventional systems and methods for providing electrical energy for controlling electrochromic devices.

In accordance with one aspect of the embodiments described herein, there is provided an electrochromic device comprising: an active electrochromic layer having optical properties that vary based on an electrical voltage applied to the active electrochromic layer; an integrated energy source integrated within the electrochromic device for generating or storing electrical energy; and a controller operatively coupled to the energy source and the active electrochromic layer for applying the electrical energy generated or stored by the integrated energy source to the active electrochromic layer to achieve the optical properties desired by a user.

In one or more embodiments, the optical properties comprise transparency, color or opacity.

In one or more embodiments, the integrated energy source comprises a solar cell.

In one or more embodiments, the solar cell is disposed to face outside of a building.

In one or more embodiments, the solar cell is separate and distinct from the active electrochromic layer and not directly mechanically attached to the active electrochromic layer.

In one or more embodiments, the electrochromic device further includes an enclosure for housing the controller, wherein the solar cell is disposed on a side of the enclosure.

In one or more embodiments, the side of the enclosure is outwardly facing side.

In one or more embodiments, the solar cell is substantially transparent.

In one or more embodiments, the solar cell is disposed directly on the active electrochromic layer.

In one or more embodiments, the solar cell is directly mechanically attached to the active electrochromic layer using glue.

In one or more embodiments, the electrochromic device further includes a substantially rigid substrate, wherein the solar cell is disposed directly on the substantially rigid substrate.

In one or more embodiments, the electrochromic device contains no wiring to an external power source.

In one or more embodiments, the controller comprises a voltage converter for converting the voltage of the integrated energy source to a voltage for controlling the active electrochromic layer to achieve the optical properties desired by a user.

In accordance with another aspect of the embodiments described herein, there is provided a method for controlling an electrochromic device comprising: providing an active electrochromic layer having optical properties that vary based on an electrical voltage applied to the active electrochromic layer; using an integrated energy source integrated within the electrochromic device to generate or store electrical energy; and using a controller operatively coupled to the energy source and the active electrochromic layer to apply the electrical energy generated or stored by the integrated energy source to the active electrochromic layer to achieve the optical properties desired by a user.

In one or more embodiments, the optical properties comprise transparency, color or opacity.

In one or more embodiments, the integrated energy source comprises a solar cell.

In one or more embodiments, the solar cell is disposed to face outside of a building.

In one or more embodiments, the solar cell is separate and distinct from the active electrochromic layer and not directly mechanically attached to the active electrochromic layer.

In one or more embodiments, the electrochromic device further includes an enclosure for housing the controller, wherein the solar cell is disposed on a side of the enclosure.

In one or more embodiments, the side of the enclosure is outwardly facing side.

In one or more embodiments, the solar cell is substantially transparent.

In one or more embodiments, the solar cell is disposed directly on the active electrochromic layer.

In one or more embodiments, the solar cell is directly mechanically attached to the active electrochromic layer using glue.

In one or more embodiments, the electrochromic device further includes a substantially rigid substrate, wherein the solar cell is disposed directly on the substantially rigid substrate.

In one or more embodiments, the electrochromic device contains no wiring to an external power source.

In one or more embodiments, the controller comprises a voltage converter for converting the voltage of the integrated energy source to a voltage for controlling the active electrochromic layer to achieve the optical properties desired by a user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there are provided novel electrochromic devices with an integrated electrical power source for electrically controlling, by varying applied electrical voltage, the absorption of light, such as electronically controlled window blinds, light filters of variable optical density, light emission modulators, and information image displays. Various embodiments of the described novel electrochromic devices may be used, for example, for creating variable light-transmitting coatings of buildings for controlling indoor microclimate by regulating the flow of natural light. Even though the following description uses the solar cell as an exemplary integrated electrical power source, the aforesaid integrated electrical power source can be any now known or later developed source of electrical energy, including, without limitation, photovoltaic (solar) cell, non-rechargeable battery, such as alkaline battery, rechargeable battery, such as NiCd, NiMH or lithium battery, nuclear isotope power generator, induction-based generator, and/or piezoelectric generator. As would be appreciated by persons of ordinary skill in the art, the invention is not limited to any specific electrical power source and any other now known or later developed source of electrical energy can also be used.

Figure 1:
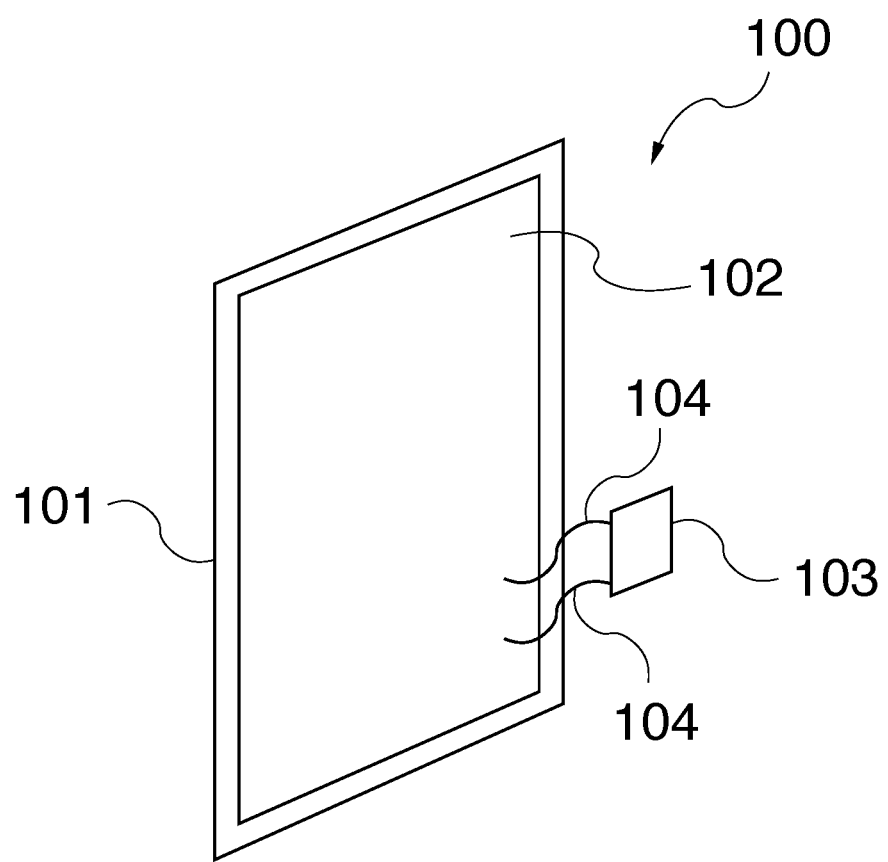
FIG. 1 illustrates a first exemplary embodiment of an electrochromic device with an integrated electrical power source

FIG. 1 illustrates a first exemplary embodiment 100 of an electrochromic device with an integrated electrical power source. In one or more embodiments, the electrochromic device 100 is disposed on a glass substrate 101, which may be a window glass, architectural glass, or any other type of optically transparent rigid or semi-rigid material. The electrochromic device 100 further includes an active electrochromic film of glass layer 102 mechanically attached to the glass substrate 101 using appropriate adhesion technique, such as glue or electrostatic adhesion. The electrochromic layer 102 is capable of varying its optical properties based on electric voltage applied to the electrochromic layer 102. The aforesaid optical properties may include transparency, color and/or opacity.

In one or more embodiments, the electrochromic device 100 further incorporates a solar cell 103 for generating electrical energy for controlling the optical properties of the electrochromic layer 102. To deliver the generated electrical energy from the solar cell 103 to the electrochromic layer 102, the latter are connected using electric conducting wiring 104. In one or more embodiments, a controller may be provided on or near the solar cell 103 for controlling the optical properties of the electrochromic layer 102 based on user commands by utilizing the electrical energy generated by the solar cell 103. On one or more embodiments, the solar cell 103 is disposed in the close proximity of the electrochromic layer 102, such as on an outer-facing side of a power-bar described in detail below with reference to FIG. 3. The controller is configured to convert the electrical energy generated by the solar cell 103 to achieve the necessary voltage (or current) for controlling the optical properties of the electrochromic layer 102 consistent with the user's commands. In one or more embodiments, the controller may incorporate a voltage converter, such as a buck converter well known to persons of ordinary skill in the art. In the same or different embodiment, the controller may incorporate a wireless receiver for receiving user's commands from a remote control operated by the user. The wireless receiver may be a radio-based receiver or an infra-red based receiver.

Figure 2:
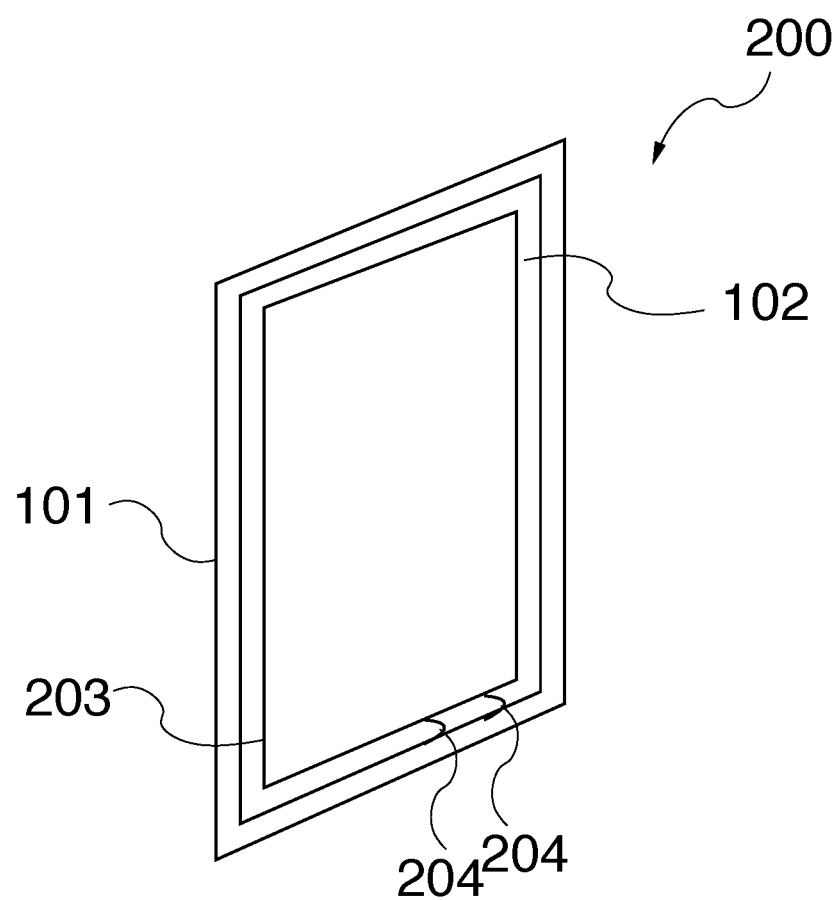
FIG. 2 illustrates a second exemplary embodiment of an electrochromic device with an integrated electrical power source.

FIG. 2 illustrates a second exemplary embodiment 200 of an electrochromic device with an integrated electrical power source. In one or more embodiments, the electrochromic device 200 is also disposed on the glass substrate 101, which may be a window glass, architectural glass, or any other type of optically transparent rigid or semi-rigid material. The electrochromic device 200 further includes an active electrochromic film or glass layer 102 mechanically attached to the glass substrate 101 using appropriate adhesion technique, such as or electrostatic adhesion. The electrochromic layer 102 is capable of varying its optical properties based on electric voltage applied to the electrochromic layer 102.

In one or more embodiments, the electrochromic device 200 further incorporates a solar cell 203 for generating electrical energy for controlling the optical properties of the electrochromic layer 102. In the electrochromic device 200, the solar cell 203 is made of a transparent material and disposed directly on the glass substrate 101 or on the electrochromic layer 102 or between them. The solar cell 203 may be directly mechanically attached to the glass substrate 101 and/or on the electrochromic layer 102 using glue or other adhesion systems or methods known in the art.

Electrically conducting wiring 204 conducts the electric energy generated by the solar cell 203 to the electrochromic layer 102 in order to control the optical properties of the electrochromic layer 102 in a manner specified by the user. In one or more embodiments, a controller may be also provided with substantially similar functions to the controller described above in connection with the embodiment 100 illustrated in FIG. 1.

Figure 3:
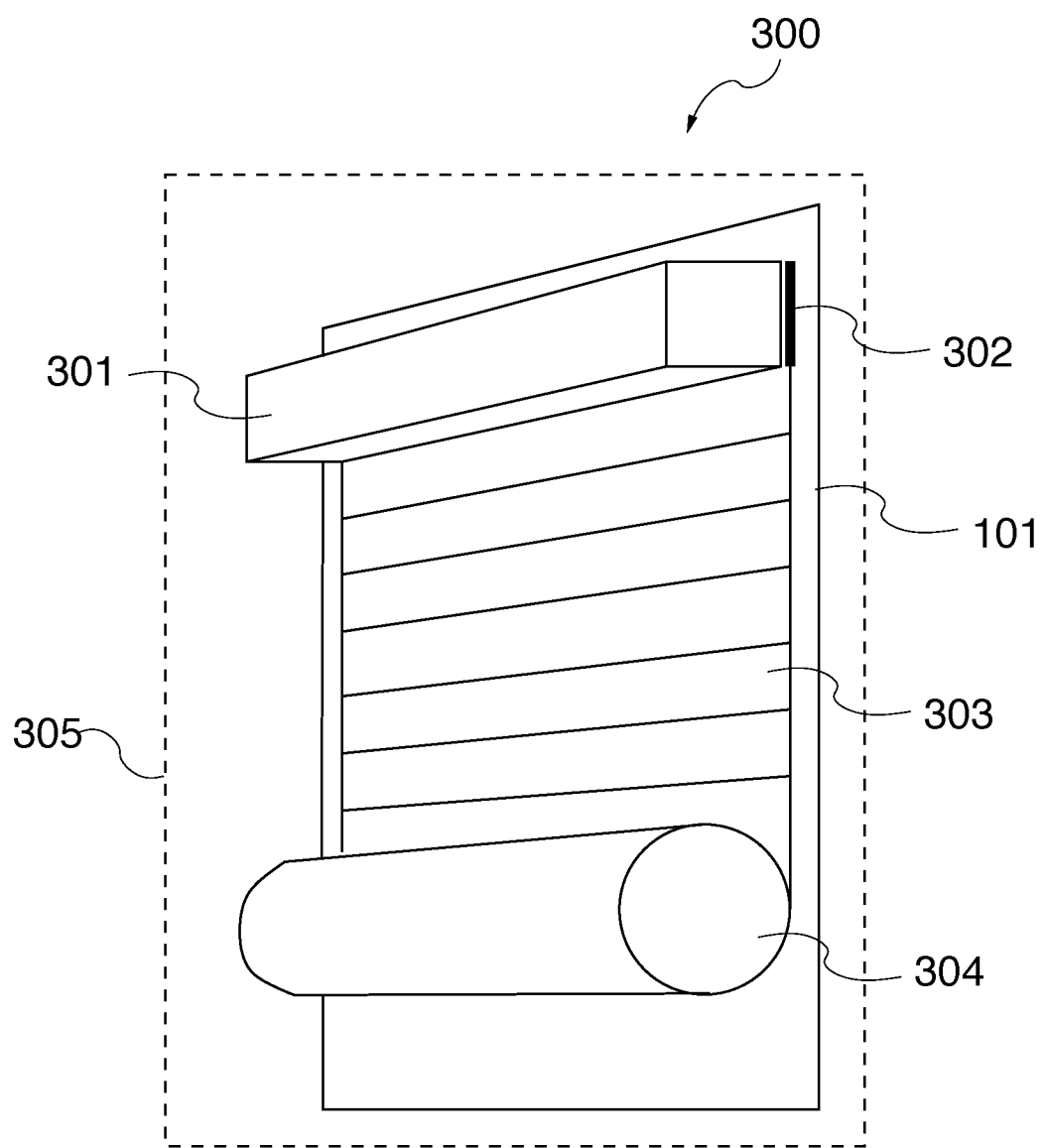
FIG. 3 illustrates a third exemplary embodiment of an electrochromic device with an integrated electrical power source.

FIG. 3 illustrates a third exemplary embodiment 300 of an electrochromic device with an integrated electrical power source. The embodiment 300 is a digitally controlled window blind employing multiple electrochromic optical stripes for controlling the amount of light passing through the blind as well as an integrated solar cell for producing electrical energy required for controlling optical properties of the electrochromic material. The exemplary embodiment 300 incorporates a plastic enclosure 301 (power bar) containing an electrical power source, such as a battery or a rechargeable battery, for providing electrical power to various components of the digitally controlled window blind as well as control electronics for controlling the blind operation. In the described embodiment, the plastic enclosure 301 additionally contains a solar cell 302 for generating electrical energy for re-charging the battery. The solar cell 302 may be directly mechanically attached to the plastic enclosure 301 using glue or other suitable fasteners, such as screws. In one embodiment, the solar cell 302 is facing outside to receive the required solar energy and is connected by the electrical wiring to the aforesaid battery or the circuitry inside the power-bar 301.

The exemplary embodiment 300 of the electrochromic device further incorporates multiple horizontal electrochromic devices (stripes) 303 applied to the glass substrate 101. In one or more embodiments, the aforesaid electrochromic stripes 303 are 30-50 mm wide. As would be appreciated by persons of ordinary skill in the art, such dimensions of the electrochromic stripes 303 will accommodate the vast majority of window sizes. In various embodiments, the electrochromic stripes 303 may be manufactured of a flexible material(s), such as plastic to give them a certain amount of flexibility. In the same or different embodiment, the electrochromic stripes 303 may be colored in different colors.

In one embodiment, the electrochromic stripes 303 may be attached, for example using glue, to a flexible substrate, such as a film (different from the substrate 101). In one embodiment, the aforesaid substrate film may be produced using any one of the available flexible transparent materials, which are well known to persons of ordinary skill in the art. Exemplary embodiments of such materials include polyester film or plastic sheeting. In one embodiment, the aforesaid substrate film with the attached electrochromic stripes 303 may be rolled into a roll 304, as shown in FIG. 3, and unrolled as necessary to cover the entire window glass or any portion thereof.

In one embodiment, the plastic enclosure 301 may be attached to the substrate (window glass) 101 by means of a glue layer. In other words, only the enclosure 301 is rigidly attached to the window 101, while the electrochromic stripes 303 are not so permanently attached. In one embodiment, the electrochromic stripes 303 are attached (attracted) to the window 101 by means of static electricity. To this end, the plastic enclosure 301 may contain a static electricity source (not shown).

In one or more embodiments, the plastic enclosure 301 may additionally include the controller with substantially similar functions to the controller described above in connection with the embodiment 100 illustrated in FIG. 1.

As shown in FIG. 3, the exemplary embodiment 300 of the electrochromic device is entirely self-contained (within the area designated 305 in FIG. 3) and internally produces all the electrical energy necessary for its operation and specifically for the operation of the controller and for controlling the optical properties of the electrochromic layer of the electrochromic stripes 303. In other words, there no external wiring or any kind is required for supplying electric energy to the electrochromic device.

In various embodiments, the controller has a Bluetooth, Wi-Fi and/or infra-red connectivity allowing the users to use their mobile devices to control the described digital blind. In one embodiment, the controller may wirelessly communicate with other similar controllers and to create controller groups. In various embodiments, the controller may be addressed individually or in groups.

In various embodiments, the functionality of the controller may accessible through a software application executing on iOS, Android (or other operating systems) as well as from a computer using an application programming interface. In one embodiment, the controller can mate with a wireless remote switch. In one embodiment, each electrochromic stripe 303 is wired and controlled separately to enable achieving running On/Off effect, which is similar to physically raising/lowering the blinds.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in various electrochromic devices. It is intended that the specification and examples be considered as exemplary only, with a true scope and spirit of the invention being indicated by the following claims.

What is claimed is:

1. An electrochromic device comprising:
   (a) an active electrochromic layer having optical properties that vary based on an electrical voltage applied to the active electrochromic layer;
   (b) an integrated energy source integrated within the electrochromic device for generating or storing electrical energy, said integrated energy source comprising a solar cell;
   (c) a controller operatively coupled to the energy source and the active electrochromic layer for applying the electrical energy generated or stored by the integrated energy source to the active electrochromic layer to achieve the optical properties desired by a user; and (d) an enclosure attached to the electrochromic device for housing the controller, said enclosure configured for containing an electrical power source that is different than the integrated energy source, wherein the electrochromic device is free from any external electrical energy supply, and wherein the solar cell is separate and distinct from the active electrochromic layer and not directly mechanically attached to the active electrochromic layer.

2. The electrochromic device of claim 1, wherein the optical properties comprise transparency, color or opacity.

3. The electrochromic device of claim 1, wherein the solar cell is disposed on an outwardly facing side of the enclosure.

4. The electrochromic device of claim 1, wherein the solar cell is substantially transparent.

5. The electrochromic device of claim 4, further comprising a substantially rigid substrate, wherein the solar cell is disposed directly on the substantially rigid substrate.

6. The electrochromic device of claim 1, wherein the controller comprises a voltage converter for converting the voltage of the integrated energy source to a voltage for controlling the active electrochromic layer to achieve the optical properties desired by a user.

7. A method for controlling an electrochromic device comprising:
(a) providing an active electrochromic layer having optical properties that vary based on an electrical voltage applied to the active electrochromic layer;
(b) using an integrated energy source integrated within the electrochromic device to generate or store electrical energy, said integrated energy source comprising a solar cell; and
(c) using a controller operatively coupled to the energy source and the active electrochromic layer to apply the electrical energy generated or stored by the integrated energy source to the active electrochromic layer to achieve the optical properties desired by a user; and
(d) providing an enclosure attached to the electrochromic device for housing the controller, said enclosure configured for containing an electrical power source that is different than the integrated energy source,
wherein the electrochromic device is free from any external electrical energy supply, and wherein the solar cell is separate and distinct from the active electrochromic layer and not directly mechanically attached to the active electrochromic layer.

8. The method of claim 7, wherein the optical properties comprise transparency, color or opacity.

9. The method of claim 7, wherein the solar cell is disposed on an outwardly facing side of the enclosure.

10. An electrochromic device comprising:
(a) an active electrochromic layer having optical properties that vary based on an electrical voltage applied to the active electrochromic layer;
(b) an integrated energy source integrated within the electrochromic device for generating or storing electrical energy, said integrated energy source comprising a solar cell;
(c) a controller operatively coupled to the energy source and the active electrochromic layer for applying the electrical energy generated or stored by the integrated energy source to the active electrochromic layer to achieve the optical properties desired by a user; and
(d) an enclosure attached to the electrochromic device for housing the controller, said enclosure configured for containing an electrical power source that is different than the integrated energy source, wherein the electrochromic device is free from any external electrical energy supply, wherein the electrical power source comprises a battery and the solar cell generates electrical energy for re-charging the battery, wherein the active electrochromic layer comprises a plurality of horizontally disposed electrochromic optical stripes, and wherein the electrical power source and controller are configured for separately controlling the plurality of electrochromic optical stripes.

11. The electrochromic device of claim 10, wherein the plurality of electrochromic optical stripes are colored in different colors and wherein the plurality of electrochromic optical stripes are attached to a flexible substrate configured to be rolled into a substantially rolled configuration and unrolled into a substantially flat configuration.

12. A method for controlling an electrochromic device comprising:
(a) providing an active electrochromic layer having optical properties that vary based on an electrical voltage applied to the active electrochromic layer;
(b) using an integrated energy source integrated within the electrochromic device to generate or store electrical energy, said integrated energy source comprising a solar cell; and
(c) using a controller operatively coupled to the energy source and the active electrochromic layer to apply the electrical energy generated or stored by the integrated energy source to the active electrochromic layer to achieve the optical properties desired by a user; and
(d) providing an enclosure attached to the electrochromic device for housing the controller, said enclosure configured for containing an electrical power source that is different than the integrated energy source, wherein the electrochromic device is free from any external electrical energy supply, wherein the electrical power source comprises a battery and the solar cell generates electrical energy for re-charging the battery, wherein the active electrochromic layer comprises a plurality of horizontally disposed electrochromic optical stripes, and wherein the electrical power source and controller are configured for separately controlling the plurality of electrochromic optical stripes.

13. The method of claim 12, wherein the plurality of electrochromic optical stripes are colored in different colors and wherein the plurality of electrochromic optical stripes are attached to a flexible substrate configured to be rolled into a substantially rolled configuration and unrolled into a substantially flat configuration.

* * * * *